W. M. WILKIN.
VALVE GEAR FOR STEAM ENGINES.
APPLICATION FILED MAY 6, 1916.
1,216,032.  Patented Feb. 13, 1917.
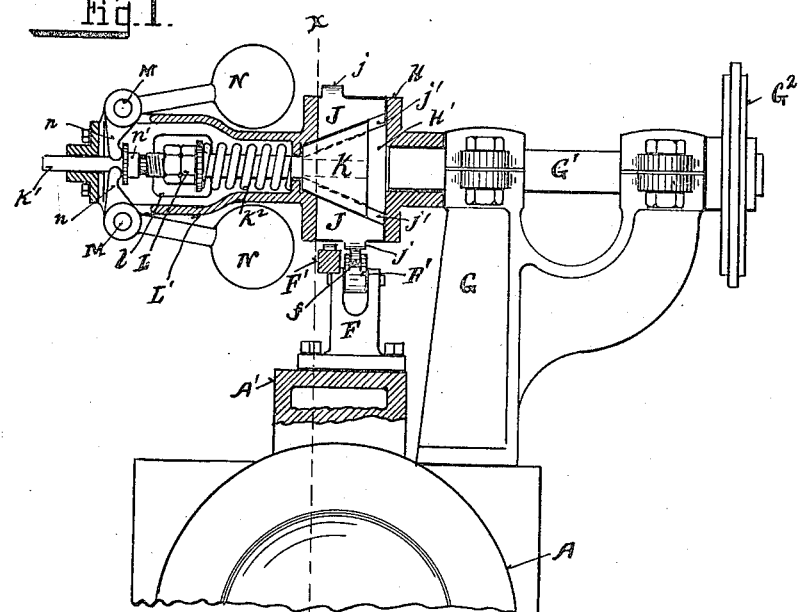
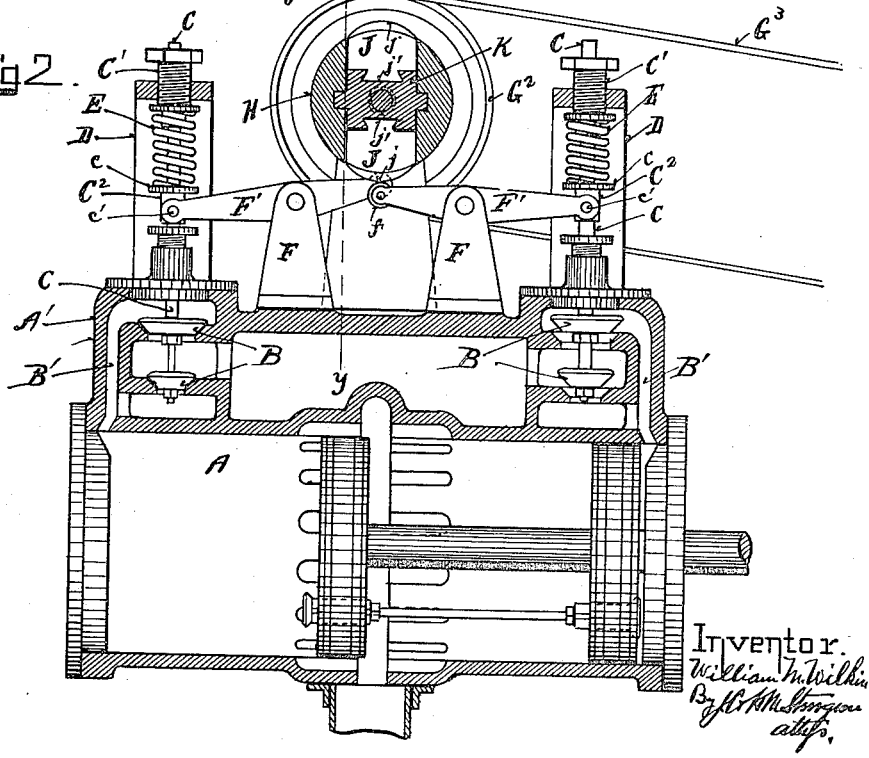

UNITED STATES PATENT OFFICE.

WILLIAM M. WILKIN, OF ERIE, PENNSYLVANIA.

VALVE-GEAR FOR STEAM-ENGINES.

1,216,032.  Specification of Letters Patent.  Patented Feb. 13, 1917.

Application filed May 6, 1916. Serial No. 95,969.

*To all whom it may concern:*

Be it known that I, WILLIAM M. WILKIN, a citizen of the United States, residing at Erie, in the county of Erie and State of Pennsylvania, have invented certain new and useful Improvements in Valve-Gear for Steam-Engines; and I do hereby declare the following to be a full, clear, and exact description of the invention, such as will enable others skilled in the art to which it appertains to make and use the same, reference being had to the accompanying drawings, and to the letters of reference marked thereon, forming part of this specification.

My invention relates to valve gear for steam engines, and the features thereof will appear hereinafter in the specification and claims, and are illustrated in the accompanying drawings, in which:—

Figure 1, is an end view of a portion of an engine cylinder showing a longitudinal section of a portion of the valve operating gear on the line $y$—$y$ in Fig. 2.

Fig. 2, is a vertical section of the same, on the line $x$—$x$ in Fig. 1.

In these drawings A, indicates an engine cylinder, A', indicates a valve chest thereon, in which valves B, operate to control the admission of steam into the steam inlet portions B'. The valves B, are provided with valve stems C, the upper ends of which are supported by U-shaped brackets D, in which I place screw threaded bushings C', through which the valve stems C, pass. Upon the valve stem C, I secure sleeves $C^2$, having a flange or washer $c$, at its upper end; and between the flange or washer $c$, and the screw threaded bushings C', I place springs E, which press downwardly on the valve stems C, for the purpose of closing the valves B.

Supported in upright brackets F F, which are secured upon the valve chest A', are levers F' F', one end of which is pivoted to the valve stem C, by means of pivots $c'$. Secured upon the cylinder A, is an upright bracket G, in which I journal a shaft G', having thereon a sprocket or gear wheel $G^2$; and upon the engine crank shaft, (not shown) I place another sprocket or gear wheel of equal diameter with the gear $G^2$; and on said two gear wheels I place a chain or gear belt $G^3$, so that the shaft G', will be rotated exactly in unison with the crank shaft of the engine.

Secured upon the shaft G', is a cylinder H, having a slot or mortise H', extending entirely across said cylinder, in which slot or mortise I place cam blocks J J, having thereon cams $j$ $j$, which are adapted to engage the rollers $f$ $f$, in the levers F' F', as the cylinder H, revolves, and operate the levers F' F', to alternately lift the valves B B, at the opposite ends of the cylinder A.

The cams $j$ $j$, are offset with relation to each other, so that the cam $j$, in one of the blocks J, operates only upon one of the levers F', while the other of said cams $j$ operates only upon the other lever F', as the cylinder H, is rotated by the shaft G', in unison with the crank shaft of the engine. To support the cam blocks J, against the resistance of the levers F', and also to prevent said cam blocks from being thrown out of the slot H', by reason of the centrifugal force, I provide a wedge K, (see Fig. 1) having a dove-tailed groove in each of its inclined surfaces, in which dove-tailed groove, dove-tailed ribs $j'$, on the blocks J J, fit, so that said blocks J J, are supported from being pressed inwardly by the wedge K, and are secured from being thrown out of the slot by means of the dove-tailed grooves and ribs $j'$.

By means of this construction of valve gear, I have been enabled to eliminate therefrom, all of the reciprocating parts, and have substituted therefor, continuously rotating parts. In order to provide for suitable regulation, I provide a stem K', which is secured to the wedge K, and upon this stem K', I place a spring $K^2$, and provide nuts L, on the stem K', which are adapted to regulate the pressure of the spring $K^2$; the spring $K^2$, acts to maintain the wedge K, in the position thereof shown in Fig. 1.

Upon the end of the cylinder H, I make a cylindrical sleeve or shell L', which incloses the stem K', and is provided with openings $l$, in the sides thereof, through which access can be had to the nuts L, for the purpose of adjusting the pressure of the spring $K^2$. Pivoted at opposite sides of the stem K', upon pivots M, in the cylindrical sleeve L', are governor balls N, provided with levers $n$, which engage a collar $n'$, on the stem K', of the wedge K, so that as the shaft G', and cylinder H, are caused to rotate faster or slower, in unison with the engine crank shaft, the centrifugal force of the balls N N, and the coöperation therewith, of the spring $K^2$, causes the wedge K, to move endwise between the blocks J J, so that said blocks J J will be drawn inwardly toward the axis of the cylinder H, as the speed of the engine crank shaft increases, and will be forced outwardly as the speed of said shaft decreases. The increase of speed causes the balls N N, to compress the spring K², and decrease of the speed, permitting the spring K², to force the balls inwardly toward the axis.

Having thus fully shown and described the mechanism embodying my invention so that others may utilize the same, it is obvious that many modifications may be made therein, without departing from the scope of my invention; therefore, I do not desire to limit myself to the exact construction of the mechanism herein shown and described, but what I desire to secure by Letters Patent, is:—

1. The combination in an engine valve gear, of a valve stem, spring mechanism to force said valve stem in one direction, a lever to move said valve stem in opposition to said spring mechanism, a shaft supported adjacent to said lever, means to rotate said shaft in unison with the engine crank shaft, a cylinder secured thereon having a slot therethrough, an axially slidable wedge therein having under-cut grooves in its inclined sides thereof, a radially slidable cam block in said slot having ribs to fit said under-cut grooves in said wedge, a cam on said block adapted to engage and actuate said valve operating lever, a stem secured to said wedge, spring mechanism adapted to act between said cylinder and said stem to force said stem and wedge in one direction, and centrifugal mechanism to move said stem and wedge in opposition to said spring mechanism, substantially as set forth.

2. The combination in a steam engine of a cylinder, a valve stem at each end thereof, spring mechanism associated with each of said valve stems to force the same in one direction, a lever engaging each of said valve stems and fulcrumed on said engine cylinder to move said valve stems in opposition to said spring mechanism, an upright bracket secured upon said engine cylinder, a shaft journaled therein, means to cause said shaft to rotate in unison with the engine crankshaft, a cylinder secured on said shaft, having a slot therethrough, an axially slidable wedge in said slot, having under-cut grooves in the inclined edges thereof, radially slidable cam blocks in said slot having ribs thereon to fit said under-cut grooves in said wedge and adapted to prevent said blocks from separating from said wedge, a cam on each of said blocks offset with relation to each other and adapted to alternately engage and actuate said valve operating levers, a stem secured to said wedge, a nut on said stem, a spring on said stem between the slotted cylinder and said nut, and adapted to force said stem and wedge in one direction, and centrifugal mechanism supported by said slotted cylinder adapted to move said stem and wedge in opposition to said spring, substantially as described.

In testimony whereof I affix my signature.

WILLIAM M. WILKIN.

Copies of this patent may be obtained for five cents each, by addressing the "Commissioner of Patents, Washington, D. C."